United States Patent Office 3,503,923
Patented Mar. 31, 1970

3,503,923
VINYLIDENE FLUORIDE POLYMER COMPOSITIONS HAVING HIGH THERMAL STABILITY
Robert Gabriel Petrella, Philadelphia, and Edward Joseph Bartoszek, Norristown, Pa., assignors to Pennsalt Chemicals Corporation, Philadelphia, Pa., a corporation of Pennsylvania
No Drawing. Filed Nov. 20, 1967, Ser. No. 684,546
Int. Cl. C08k 1/06, 1/16, 45/56
U.S. Cl. 260—41                        2 Claims

ABSTRACT OF THE DISCLOSURE

Vinylidene fluoride polymer compositions having high thermal stability are comprised of a blend of 55 to 94% of polyvinylidene fluoride, 5 to 44% of a filler selected from the group consisting of carbon black and chromic oxide and 1 to 15% of zinc oxide. The compositions are suitable for molding into various shapes by conventional plastics processing operations.

---

This invention relates to filled and stabilized vinylidene fluoride polymer compositions, and more particularly concerns a composition comprised of polyvinylidene fluoride containing in admixture as essential ingredients carbon black or chromic oxide as a filler and zinc oxide as a stabilizer, wherein the filler and stabilizer combination act in a synergistic manner to give the composition high thermal stability.

Polyvinylidene fluoride is a thermoplastic resin which has found wide and diverse use because of its combination of desirable properties such as high mechanical strength and toughness, resistance to lower temperature embrittlement, resistance to chemicals and solvents, stability to ultraviolet light and extreme temperature conditions, resistance to gamma radiation, self extinguishing properties with respect to fire, and relatively good thermal stability. Polyvinylidene fluoride in its powder or pellet form can be readily fabricated into sheets, rods, tubes and more intricate shapes by compression molding, injection molding, extrusion, transfer molding, blow molding, vacuum forming and the like operations. These shapes can be machined to fine tolerances if desired. Fillers have been mixed with polyvinylidene fluoride in order to increase its stiffness and strength and to reduce mold shrinkage. As mentioned previously, polyvinylidene fluoride does have significantly greater thermal stability than other thermoplastic polymers which can be fabricated by the foregoing heat-forming operations. However, at the temperatures at which such fabrication operations are carried out, e.g. about 425° F. to about 650° F., there is some heat degradation of the polymer. In many cases the filler material mixed with the polymer, for example, $SiO_2$, $TiO_2$, MgO, $Sb_2O_3$, asbestos, and mica, will accelerate this degradation.

It has now been discovered that a composition comprising a homogenous mixture of vinylidene fluoride polymer, a filler selected from the group consisting of carbon black and chromic oxide, and a minor amount of zinc oxide provides a polyvinylidene fluoride composition having unexpectedly good heat stability. It is to be understood that the terms "polyvinylidene fluoride" and "vinylidene fluoride polymer" as used throughout this specification are meant to refer not only to the homopolymer of vinylidene fluoride but also to the copolymers of vinylidene fluoride with up to about 40 mole percent of one or more comonomers therewith such as tetrafluoroethylene, vinyl fluoride, 1 - chloro-1,2,2-trifluoroethylene, sym.-dichlorodifluoroethylene, hexafluoropropylene, and others known in the art. The copolymers of vinylidene fluoride containing at least about 60 mole percent of vinylidene fluoride monomer groups exhibit all the good properties of the homopolymer and are susceptible to the same types of fabricating operations in both the filled and unfilled form.

More specifically, the compositions of this invention comprise a homogenous mixture of from about 55 to about 94% by weight of polyvinylidene fluoride, from about 5 to about 44% by weight of a filler selected from the group consisting of carbon black and chromic oxide, and from about 1 to about 15% by weight of zinc oxide, the combined percentages of filler and zinc oxide being not greater than 45%. The preferred proportions are about 65 to 78 wt. percent of vinylidene fluoride polymer, about 20 to 30 wt. percent of the filler, and about 2 to 5 wt. percent of zinc oxide. (The foregoing percentages should, of course, total 100% for any given composition.)

The compositions of this invention are conveniently prepared in the usual manner by blending the ingredients in a finely-divided or powdery form using suitable plastics mixing apparatus, such as, for example, a dry blender, an intensive internal mixer, e.g. a Brabender or Banbury mixer, or a roller mill such as the conventional rubber mills. Blending can also be accomplished in an extrusion operation prior to pelletizing the product. The blending of the ingredients is generally carried out at temperatures in the range of ambient to about 500° F. depending on the type of mixing apparatus used. If desired, a plasticizer can be added to the compositions to serve as a processing aid, for example, about one to about five parts by weight of plasticizer per 100 parts by weight of the vinylidene fluoride polymer. Recommended plasticizers are polyesters having a molecular weight of from about 1100 to about 5000, a boiling point above about 400° C., and consisting essentially of recurring units of the formula

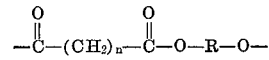

where $n$ is an integer of 4 to 8 and R is an alkylene group of 4 to 7 carbon atoms.

The following examples are presented to illustrate the vinylidene fluoride polymer compositions of the present invention and to show the significant and surprising improvement in heat stability obtained with the unique combination of additives. Samples for testing were prepared by blending the polyvinylidene fluoride, the filler and the zinc oxide in a Brabender mill at a temperature of about 437° F. Sample plaques were prepared by preheating the blends at 437° F. for 4 minutes and then compression molding the compositions at 437° F. for 4 minutes at 20,000 p.s.i. The thermal stabilities of the compositions were determined by measuring the weight loss of the compression molded plaques held at a temperature of 850° F. for one hour. The relative stability was thus determined by the degradation as measured by the weight loss of the sample based on original sample weight. This testing at the extreme temperature of 850° F., which is higher than that at which polyvinylidene fluoride compositions are generally thermally fabricated and processed, is an accurate indication of the heat stability properties. Compositions which do not give satisfactory results in this accelerated heat stability test will not perform satisfactorily on a commercial scale when processed at the lower fabrication temperatures of 425 to 650° F. because of heat degradation.

The following data in Table I illustrate the results achieved by practising the invention embodied herein:

TABLE I

| Example No. | Composition, constituents in percent by weight | | | | | Thermal stability, percent weight loss after one hour at 850° F. |
| --- | --- | --- | --- | --- | --- | --- |
| | Polyvinylidene fluoride | Carbon black | Chromic oxide | Zinc oxide | Plasticizer [1] | |
| 1 | [2] 100 | | | | | 30 to 50. |
| 2 | 83.3 | | | 16.7 | | 22.4. |
| 3 | 57.5 | | 42.5 | | | 14.4. |
| 4 | 87.2 | 12.8 | | | | 39.0. |
| 5 | 79.1 | 14.7 | | 6.2 | | 5.7. |
| 6 | 61.9 | | 33.3 | 4.8 | | 6.9. |
| 7 | 70.1 | 22.6 | | 6.1 | 1.2 | 6.6. |
| 8 | 70.9 | 21.9 | | 6.2 | 1.0 | 5.5. |

[1] NP-10 polyester plasticizer (product of Eastman Chemical Products Co.).
[2] Controls.

The foregoing data confirm that to obtain a polyvinylidene fluoride composition having outstanding thermal stability, it is necessary to use a combination of the zinc oxide stabilizer with a filler selected from the group of carbon black and chromic oxide.

Other outstanding properties of the compositions of this invention, particularly with regard to dimensional stability and mold shrinkage, are illustrated by the data set forth in Table II. Example 9 is unmodified polyvinylidene fluoride. Example 10 is a composition comprised of 70.9% of the polyvinylidene fluoride, 21.9% carbon black, 6.2% zinc oxide, and 1.0% NP-10 plasticizer.

TABLE II

| Property | Example 9 | Example 10 |
| --- | --- | --- |
| Vicat softening point, ° F | 320 | 320 |
| Melting point, ° F | 340 | 340 |
| Molding temperature, ° F | 400-525 | 400-525 |
| Mold shrinkage, percent | 3.5 | 2.3 |
| Coefficient of linear expansion, in. $\times 10^{-5}$° F | 1.20 | 0.947 |
| Hardness, Shore | 75 | 80 |
| Water absorption, percent | 0.04 | 0.00 |
| Machining qualities | Excellent | Excellent |

We claim:
1. A vinylidene fluoride polymer composition having high thermal stability comprising a blend of about 55 to about 94% by weight of polyvinylidene fluoride, about 5 to about 44% by weight of a filler selected from the group consisting of carbon black and chromic oxide, and about 1 to about 15% by weight of zinc oxide.

2. A composition according to claim 1 wherein there is about 65 to 78 wt. percent of polyvinylidene fluoride, about 20 to 30 wt. percent of the filler, and about 2 to 5 wt. percent of zinc oxide.

References Cited

UNITED STATES PATENTS 2,833,752   5/1958   Horn et al. _____ 260—45.75
3,111,499  11/1963   Hueck et al. _____ 260—45.75
3,154,519  10/1964   Iserson _____ 260—92.1

MORRIS LIEBMAN, Primary Examiner

SAMUEL L. FOX, Assistant Examiner

U.S. Cl. X.R.

260—45.75